UNITED STATES PATENT OFFICE.

CHARLES A. BECKER, OF NEWARK, NEW JERSEY.

PROCESS OF MAKING CHAIN.

1,273,810.  Specification of Letters Patent.  Patented July 30, 1918.

No Drawing.  Application filed October 16, 1915. Serial No. 56,231.

*To all whom it may concern:*

Be it known that I, CHARLES A. BECKER, a citizen of the United States, and a resident of Newark, in the county of Essex and State of New Jersey, have invented certain new and useful Improvements in Processes of Making Chain, of which the following is a specification.

This invention relates to the manufacture of chain from solder wire or wire having a core of solder, and the objects of the invention are to secure a perfect union of the ends of the wire in each link, without connection to the next adjacent link by escaping solder; to prevent stiff soldering or beads of solder on the outer surface of the links or chain; to secure a strong chain of clean appearance; to simplify the work and save labor, and to obtain other advantages and results as may be brought out in the following description.

In carrying out my invention, the wire is drawn to the desired size and annealed as required, said drawing and annealing being performed in any well-known manner common to the art. Then the wire as finally annealed, with its outer surface tarnished or coated from said annealing, is fed to a chain-making machine which bends the links and connects them together with their joints between the ends of the wire simply pressed together. It will be understood that in doing this the chain-making machine cuts the wire into proper lengths to form the links and thus the ends of each length are bright and clean, and it is these ends which are brought together to be afterward soldered, the rest of the surface of the link being tarnished or coated as above referred to. The chain thus formed is then treated with a solution of borax or other soldering salt or flux, as by boiling it in such a solution, and dried, so that the chain is covered with the soldering salt or flux. Not only is the outer surface of the links so covered, but also the cut end surfaces, and the slight spaces between said end surfaces are practically filled.

The chain is then rubbed in any well-known manner or subjected to mechanical means for removing surplus soldering salt or flux, principally from the outer surface of the links, though perhaps incidentally affecting the soldering salt or flux between the joint surfaces or ends of the wire of each link. After this treatment for the removal of surplus soldering salt or flux, the chain is run through a soldering flame or otherwise heated to close the joints by causing the solder to run or soften, as will be understood by those skilled in the art. It should be noted that when this closing is done the joint surfaces of the links are covered with soldering salt or flux, while the rest of the surface of the links is devoid of soldering salt or flux, but tarnished or coated from the annealing. With the chain in this condition the soldering flame effects a very clean and perfect closure of the joints of the links, which are clean cut and covered with borax, without in any way affecting the outer surface of the links or chain.

After soldering the chain is cleaned with acid or the like, preferably dilute sulfuric acid, in any manner in which it has been common and well-known heretofore to clean chain or the like.

The foregoing illustrates my invention, but I do not wish to be understood as representing that it cannot be carried out in other ways. Any method by which an anti-soldering coat is produced upon the outside surfaces of the links and then a soldering coat formed upon the joint surfaces without removing said anti-solder coat is within the scope of my invention, and I do not wish to be understood as limiting myself except as required by the following claims when construed in the light of the prior art.

Having thus described the invention, what I claim is:—

1. A process of making chain from solder wire, consisting in annealing the wire, cutting the wire as tarnished by annealing into lengths and forming them into connected links with their bright cut ends in position for soldering, coating said links with soldering salt or flux, removing said salt or flux from the outer surfaces of the links and leaving said surfaces in substantially the same condition as after annealing, and closing the joints with a soldering heat.

2. A process of making chain from solder wire, consisting in annealing the wire, cutting the wire as tarnished by annealing into lengths and forming them into connected links with their bright cut ends in position for soldering, coating said links with soldering salt or flux, removing said salt or flux except from the joint surfaces of the links, and closing the joints with a soldering heat.

3. A process of making chain from solder wire, consisting in annealing the wire, cutting the wire as tarnished by annealing into lengths and forming them into connected links with their bright cut ends in position for soldering, coating said links with soldering salt or flux, removing the surplus soldering salt or flux, and closing the joints with a soldering heat.

4. A process of making chain from solder wire, consisting in producing upon the wire an anti-soldering coat, cutting the wire into lengths and forming them into connected links with their bright cut ends ready for soldering, coating said links with a soldering salt or flux, removing the soldering salt or flux from the anti-soldering coat, and closing the joints by heat.

5. A process of making chain, consisting in producing a series of links of solder wire with bright cut ends in position for soldering and side surfaces covered with an anti-soldering coat, covering said links with a soldering salt or flux, removing said salt or flux from the anti-soldering coat, and closing the joints by heat.

6. A process of making chain from solder wire, consisting in producing an anti-soldering coat upon the links except at their joint surfaces, coating said links with a soldering salt or flux, removing said salt or flux except from the joint surfaces and exposing the anti-soldering coat, and closing the joints by heat.

CHARLES A. BECKER.

Copies of this patent may be obtained for five cents each, by addressing the "Commissioner of Patents, Washington, D. C."